United States Patent [19]

Hatanaka et al.

[11] Patent Number: 4,783,145
[45] Date of Patent: Nov. 8, 1988

[54] MULTIPLE GRADATION DOT-MATRIX PICTURE FORMING METHOD

[75] Inventors: Isamu Hatanaka; Masaaki Takimoto, both of Tokyo, Japan

[73] Assignee: Fuji Photo Film Co., Ltd., Kanagawa, Japan

[21] Appl. No.: 890,242

[22] Filed: Jul. 28, 1986

[30] Foreign Application Priority Data

Jul. 29, 1985 [JP] Japan .................. 60-167318

[51] Int. Cl.⁴ .................................. G02F 1/13
[52] U.S. Cl. ..................... 350/331 R; 350/333; 350/339 R; 350/342
[58] Field of Search .............. 350/330, 331 R, 333, 350/342, 346, 350 S

[56] References Cited

U.S. PATENT DOCUMENTS

| | | | |
|---|---|---|---|
| 4,334,734 | 6/1982 | Hareng et al. | 350/331 R |
| 4,548,476 | 10/1985 | Kaneko | 350/350 S |
| 4,605,972 | 8/1986 | Hatanaka | 358/302 |
| 4,634,226 | 1/1987 | Isogai et al. | 350/350 S X |

Primary Examiner—John S. Heyman
Assistant Examiner—Richard F. Gallivan
Attorney, Agent, or Firm—Sughrue, Mion, Zinn, Macpeak & Seas

[57] ABSTRACT

A method of forming a dot-matrix image, in which uniform light is applied to an array of light gates. The transmission of each of the light gates is controlled over several steps according to pictorial data to thus provide a finely graded image. Preferably, a contact screen converts the graded intensities to differently sized dots.

10 Claims, 6 Drawing Sheets

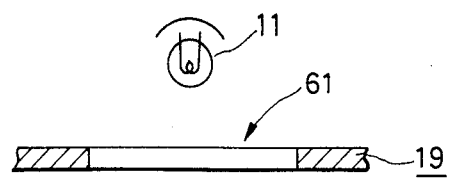
FIG. 5
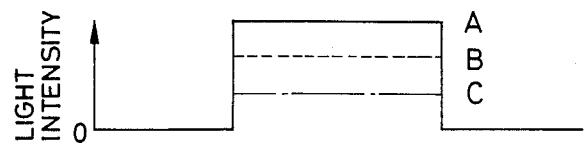
FIG. 6
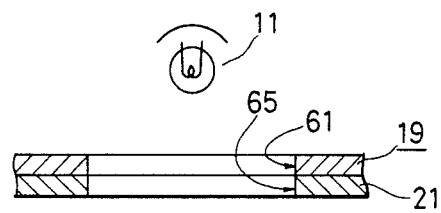
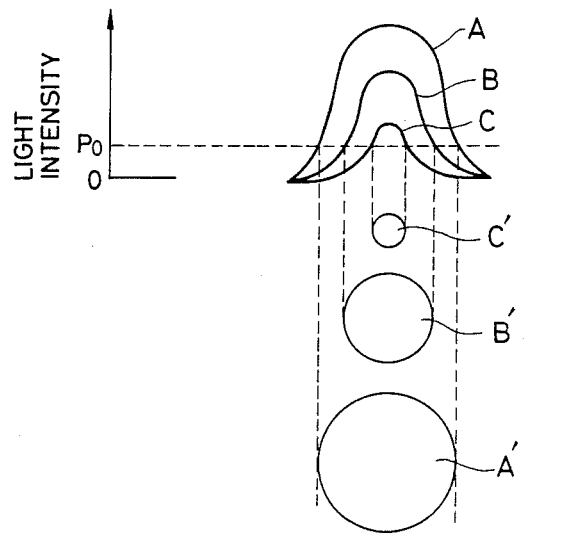

MULTIPLE GRADATION DOT-MATRIX PICTURE FORMING METHOD

BACKGROUND

1. Field of the Invention

This invention relates generally to electronic image generation. In particular, it relates to a dotmatrix image formation method in which light is passed through each of a plurality of pixel light gates which are controlled according to imaging data and are caused to have an intensity distribution.

2. Description of the Background Art

There is well known a dot-matrix image forming method for forming a pictorial image on a photo-sensitive material by using dots that are controlled according to pictorial data, usually in the form of electrical signals. This method may be practiced by using, for instance, an image forming device which is manufactured by HELL Co. and sold under the trademark "CHROMACOM".

In the method, a laser beam is used to form dots different in size on the photo-sensitive material, thereby to form a dot-matrix picture having finely distributed gradation.

The method is extensively employed, because it is advantageous over the method of reproduction photography of forming dot-matrix images by using, for instance a contact screen. The advantages lie in the fact that the photo-sensitive material can be readily handled, pictures and characters can be readily edited by controlling the electrical signals, electrical signals can be readily and satisfactorily corrected by a machine operator while corresponding operations on the completed picture would be virtually impossible for a technician to accomplish. An example of such a correction would be improving the saturation of an exposed picture.

Japanese Patent Application (OPI) No. 98073/1981 has disclosed an apparatus in which a liquid crystal light gate is disposed between a light source and an "ElectroFax" sheet and is driven by electrical signals to perform the printing operation.

Owing to the rapid progress of electronics, the control section of an apparatus for practicing the abovedescribed method of forming dot-matrix pictures by using a laser beam can be manufactured at low cost. However, the apparatus is still expensive as a whole because the optical system and its laser beam scanner have a considerably high manufacturing cost. Furthermore, since the scanner is intricate in construction, the maintenance of the apparatus is rather troublesome. Accordingly, the apparatus is used only in large central facilities and wide use of the apparatus cannot be expected at the present.

The printing apparatus with a liquid crystal light gate, as disclosed by Japanese Patent Application (OPI) No. 98073/1981, is intended for a copying operation, and cannot form pictures rich in gradation.

SUMMARY OF THE INVENTION

An object of this invention is to provide a lowcost dot-matrix image forming method. In particular, an object of this invention is to provide a dot-matrix picture forming method in which the optical system and the laser scanner of the conventional apparatus, which increase the manufacturing cost of the apparatus and are sources of failures of the apparatus, are replaced by a light gate which is relatively low in manufacturing cost and free from failure.

The foregoing objects of the invention have been achieved by a dot picture forming method in which, according to the invention, a light source applies light through a plurality of pixels of a light gate array to a photo-sensitive material. The quantities of light passing through the individual light gates are adjusted by controlling the light gates according to picture data. Thereby, a picture is formed on the photo-sensitive material. The light passing through each light gate is modulated to have an illuminance (intensity) distribution before reaching the photosensitive material.

In practicing the invention, it is preferable that the intensity distribution is formed by a contact screen.

Furthermore in practicing the invention, it is preferable that the light gate array is made up of a liquid crystal array.

In practicing the invention, it is also preferable that the contact screen be in close contact with the light gate array or be adjacent to the array.

In practicing the invention, it is preferable that the contact screen be set in close contact with the photosensitive material or adjacent to the latter.

In practicing the invention, it is preferable that the illuminance distribution be formed by an image-forming lens and an aperture plate which is located between the light source and the light valve and which are arranged on the optical path of the light source.

Furthermore in practicing the method of the invention, it is preferable that a photo-sensitive material whose gamma ($\gamma$) value is at least one (1), and the photo-sensitive material is moved by a conveying mechanism.

In the dot picture forming method of the invention, the light beams which have passed through the picture elements of the light gate array and have intensity distributions are applied to the photo-sensitive material having a gamma ($\gamma$) value of at least one (1) which is arranged below the light gate. Accordingly, dots are formed only at the parts of the photo-sensitive material which are exposed to the quantity of light larger than the critical quantity of light for exposing the photo-sensitive material. In this case, the area of each dot depends on the area of the illuminance distribution which provides the quantity of light larger than the critical quantity of light. That is, if the area of the intensity distribution is large, then the formed dot is large in area and if the area of the illuminance distribution is small, then the formed dot is small in area. Accordingly, a picture is formed on the photosensitive material by the dots which are formed in correspondence to the picture elements, and the gradations of the picture are provided by the variations in size of the dots which are determined according to the illuminances of the light beams passed through the picture elements.

Thus, the picture formed on the light gate according to the electrical signals is transferred onto the photo-sensitive material, that is, a dot-matrix picture is formed on the photo-sensitive material.

BRIEF DESCRIPTION OF THE DRAWINGS

FIGS. 5 and 6 are explanatory diagrams for a description of the effects of a contact screen shown in FIG. 1.

DETAILED DESCRIPTION OF THE PREFERRED EMBODIMENTS

Figure 1:
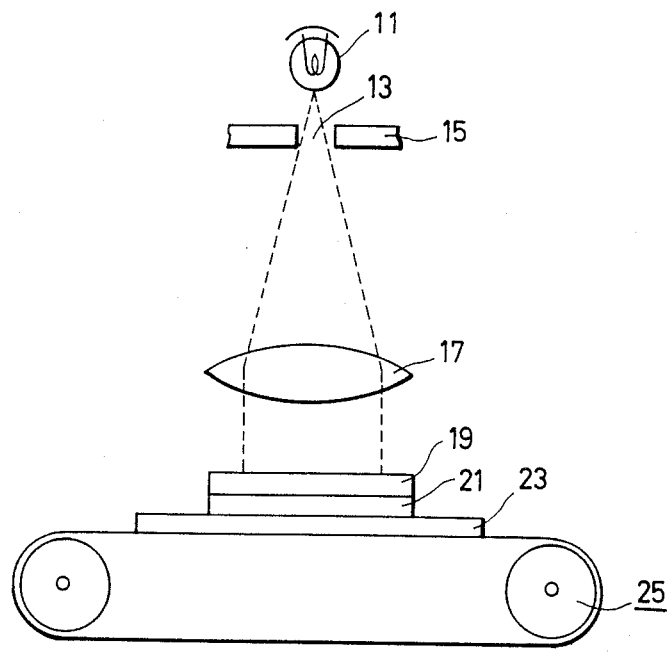
FIG. 1 is a diagram showing the arrangement of one example of an apparatus which is provided to form dot pictures according to a dot picture forming method of this invention.

Several preferred embodiments of the invention will be described with reference to the accompanying drawings. The figures are simplified to the extent that the invention can be easily understood, and therefore the dimensions, configurations and arrangements of the components of the embodiments are not limited to those which are illustrated therein. In these figures, like parts are designated by like reference numerals or characters.

FIRST EMBODIMENT OF THE INVENTION

Dot-matrix picture forming apparatus

Before the dot-matrix picture forming method according to this invention is described, an apparatus for forming dot-matrix pictures according the method of the invention will be briefly described. FIG. 1 is a diagram outlining the arrangement of one example of the apparatus.

In FIG. 1, a point light source 11 can be either a halogen lamp or xenon flash. An aperture member 15 having a pin hole 13 is disposed in front of the point light source 11 to convert the point light rays from the point light source 11 into an ideal point source. A lens 17 converts light rays from the point light source 11 into parallel light rays having a uniform distribution. A light gate 19 is composed of a liquid crystal array or liquid crystal matrix (hereinafter referred to as "a liquid crystal panel"). The lens 17, light valve 19 and a contact screen 21 are disposed, in the stated order, along the optical axis of the light beam which is emitted from the point light source 11 and which passes through the pin hole 13. The positional relationship of the liquid crystal panel 19 and the contact screen 21 is such that the light crystal panel 19 and the screen 21 are bonded together in the preferred embodiment. More specifically, the liquid crystal panel 19 and the contact screen 21 are bonded together in such a manner that, on the side of the liquid crystal panel 19 which is opposite to the side where the point light source 11 is provided, the pixels (described later) of he liquid crystal panel 19 are laid on the apertures (described later) of the contact screen 21.

A conveying mechanism 25 is provided below the contact screen 21 to move a photo-sensitive material 23 to the contact screen 21. The conveying mechanism 25 operates to move the photo-sensitive material 23 stepwise so that parts of the photo-sensitive material 23, equal in area to the part of the liquid crystal panel 19 which has the picture forming light gates, are successively moved with respect to the contact screen. The conveying mechanism 23 also brings the photo-sensitive material 23 into close contact with the contact screen when the photosensitive material 23 is exposed to light to thereby form a picture.

Liquid Crystal Panel (Light Valve)

The liquid crystal panel 19 in the apparatus is of the so-called "array" or "matrix" type. The structure and the operating principle of the liquid crystal panel will be briefly described.

Figure 2:
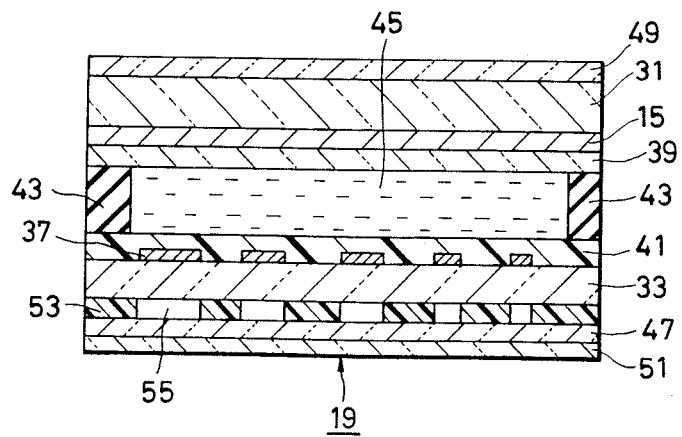
FIG. 2 is a sectional view of a light gate array (or liquid crystal panel) used in the dot picture forming method of the invention.
Figure 3:
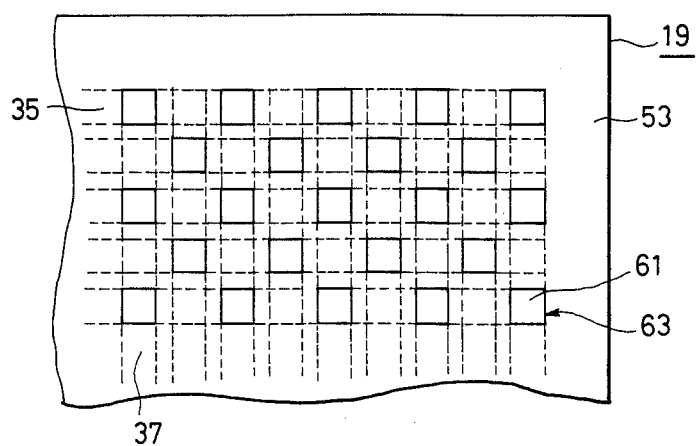
FIG. 3 is a plan view showing essential components of the light gate (or liquid crystal panel).

FIG. 2 is a sectional view outlining the liquid crystal panel 19 employed as the light valve in the dot picture forming method of the invention. FIG. 3 is a plan view for a description of the positional relationships of electrodes in the liquid crystal panel 19.

In these figures, the panel includes an upper glass plate 31 and a lower glass plate 33 bounding the active array. A number of transparent horizontal electrodes 35 are arranged on the inner surface of the upper glass plate 31, and a number of transparent vertical electrodes 37 are arranged on the inner surface of the lower glass plate 33. Orientation films 39 and 41, which can orient twisted nematic liquid crystal molecules in one direction, are formed inwardly over the horizontal electrodes 35 and the vertical electrodes 37, respectively. A preferred example of the orientation films 39 and 41 is a PVA (Polyvinyl Alcohol) film. The film is coated over the glass support and then thermally set. Thereafter, the film is rubbed in a predetermined direction by a brush and the like to form orientation scratches. The upper glass plate 31 and the lower glass plates 33 with their associated electrodes 35 and 37 and orientation films 39 and 41 are disposed in such a manner that the horizontal electrodes 35 face the vertical electrodes 37 and the horizontal electrodes 35 are perpendicular to the vertical electrodes 37. Also, there is a predetermined space between the two glass plates 31 and 33. The glass plates 31 and 33 thus disposed are bonded together with a sealing material 43. The intersections of the horizontal electrodes 35 and the vertical electrodes 37 correspond to the aforementioned pictures elements or pixels 61 (FIG. 3). The sealed space between the glass plates is filled with twisted nematic liquid crystal 45 in a well-known manner.

A polarizing plate 49 is provided on the outer surface of the upper glass plate 31, and a filter 47 is provided on the outer surface of the lower glass plate 33. A polarizing plate 51 is provided on the filter 47 in such a manner that the polarization axis of the polarizing plate 49 on the upper glass plate 3 is perpendicular to the polarization axis of the polarizing plate 51. A liquid crystal panel in which two polarizing plates are arranged as described above is called "a positive liquid crystal panel". As the positive liquid crystal panel is superior in gradation to the negative liquid crystal panel, the former is employed in the invention (as described in detail later). However, the negative liquid crystal panel in which two polarizing plates are so arranged that their polarization axes extend in the same direction may be employed in the invention. However, in this case, the behavior of transmitting and blocking light in response to control of the voltage across the electrodes is opposite to that in the case of the positive liquid crystal panel.

A mask layer 53, shown in FIG. 2, formed over the vertical electrodes 37 and is an opaque film which has through-windows 63 in correspondence to the pixels 61 of the liquid crystal panel 19 as shown in FIG. 3, thus permitting the transmission of light through the windows 63 only. The mask layer 53 is formed by a sputtering of metal such as chromium Cr. The mask layer 53 is formed on the vertical electrodes 37 in the embodiment. In order to increase the intervals of the through-windows 63, the windows 63 are arranged in a staggered pattern. Therefore, the leakage of light between the through-windows is minimized, and the contrast ratio of the liquid crystal panel 19 is improved. It goes without saying that the picture elements covered by the mask layer (not enclosed by solid lines in FIG. 3) are not used for forming pictures. According to experiments done by the present inventors, the contrast ratio of the liquid crystal panel 19 is in which the through-windows 63 are arranged in a staggered arrangement, as described above, is more than 100.

In the liquid crystal panel 19 thus constructed, the directions of orientation of the nematic liquid crystal molecules on the horizontal and vertical electrodes 35 and 37 are shifted by 90° from each other by the orientation films 39 and 41. When no voltage is applied across the horizontal and vertical electrodes 35 and 37 of the liquid crystal panel 19, the light passing through the upper polarizing plate 49 is coverted into a linearly polarized light and is applied to the layer of nematic liquid crystal 45. The light then reaches the lower polarizing plate 51 with the polarization plane turned 90° according to the liquid crystal molecule orientation. The polarization axis of the polarizing plate 51 is perpendicular to that of the polarizing plate 49 as was described before. Therefore, the light which has reached the lower polarizing plate 51 with the polarization plane turned 90° passes through the lower polarizing plate 51. On the other hand, when a voltage which is higher than a TN (Twisted Nematic) effect threshold voltage (hereinafter referred to merely as "a threshold voltage") is applied across the horizontal and vertical electrodes 35 and 37, the molecules of the nematic liquid crystal 45 are so orientated by the electric field formed therein that the light that has passed through the upper polarizing plate 49 then passes through the nematic liquid crystal 45 with the polarization plane maintained unchanged. Therefore, the light which has reached the lower polarizing plate 51 is blocked by the lower polarizing plate 51, with its polarization axis being perpendicular to the polarization axis of the upper polarizing plate 49. In the range of voltages which are higher than the threshold voltage to some extent, the polarization rotation of the liquid crystal 45 changes with the voltage applied across the horizontal and vertical electrodes. The degree of polarization rotation in the liquid crystal 45 determines what percentage of light is transmitted through the lower polarization plate 51. Hence small variations in the polarization rotation produces small variations in the transmitted light. A gradual increase in the transmitted light will be referred to as an increase in the liquid crystal opening.

Figure 4:
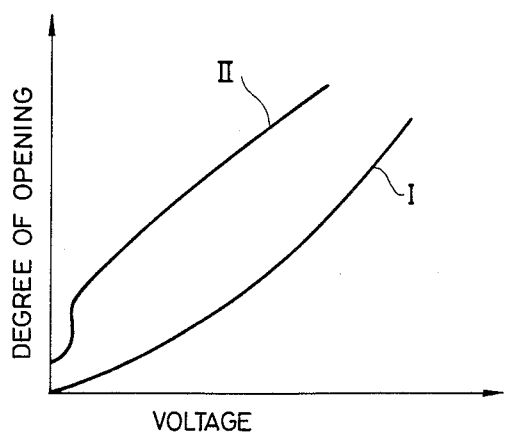
FIG. 4 is a graph indicating the degree of opening of the liquid crystal in the liquid crystal panel as a function of applied voltage.

FIG. 4 shows the degree of opening of the liquid crystal with the voltages in the above-described range. In FIG. 4, the horizontal axis represents the voltage, and the vertical axis represents the degree of opening. That is, the degree of opening of the liquid crystal is plotted while the voltage applied across the vertical and horizontal electrodes is being changed. Further FIG. 4 shows a characteristic curve I of the aforementioned positive liquid crystal panel and a characteristic curve II for the negative liquid crystal panel. The positive liquid crystal panel is more regular in the variation of the degree of opening of the liquid crystal with respect to the applied voltage than the negative liquid crystal panel. Therefore, the positive liquid crystal panel can more easily control the transmission of light than the negative liquid crystal panel. In other words, the positive liquid crystal panel can readily provide gradations in forming pictures when compared with the negative liquid crystal panel. This is the reason why the positive liquid crystal panel 19 is preferably employed as the light gate in the invention.

The above-described characteristic can be utilized to control the transmittance of light passing through the liquid crystal panel 19 by adjusting the voltage applied across the liquid crystal 45. That is, the optical transmittances for the pixels can be varied by changing the voltages for the pixels so that the pixels can express or produce different densities. Thus, a picture rich in gradation can be formed with the liquid crystal panel by applying voltages thereto according to the picture data.

In the above-described embodiment, the optical transmittance of the liquid crystal panel is controlled by changing the voltage applied thereto. However, the optical transmittance of the liquid crystal panel can be controlled also, for instance, by a pulse-number modulation system or a pulse-width modulation system.

The above-described liquid crystal panel 19 uses the twisted nematic liquid crystal; however, it may employ a smectic liquid crystal or the like.

Contact Screen

FIGS. 5 and 6 are diagrams useful for a brief description of the principle that dots are formed when the contact screen 21 is included in the apparatus shown in FIG. 1.

When any one of the pixels 61 of the liquid crystal panel 19 is enabled to transmit light, light from the point light source 11 passes uniformly through the enabled pixel 61. The distribution of intensity of the light thus transmitted is substantially rectangular as shown in FIG. 5. That is, in the region corresponding to the pixel 61, the optical intensity is uniform, but in the remaining region the optical intensity is zero (0). In the region corresponding to the pixel 61, the intensity of the transmitted light changes with the degree of opening of the liquid crystal which is varied with the voltage applied across the horizontal and vertical electrodes 35 and 37 according to the picture data, as indicated in FIG. 5 at A, B and C (in the order of the decreasing degree of opening of liquid crystal). These non-zero levels are shown in FIG. 5. Two levels could be used but many levels provide better gradation.

On the other hand, as shown in FIG. 6, the contact screen 21 and the liquid crystal panel 19 are bonded together in such a manner that the contact screen 21 is on the side of the liquid crystal panel 19 which is opposite to the side of the light source 11, and that apertures 65 of the contact screen 21 coincide with the pixels 61. In the apparatus thus constructed, the light beams from the point light source 11 which have the optical intensity distributions as indicated at A, B and C in FIG. 5, provide, for instance, Gaussian intensity distributions as indicated at A, B and C in FIG. 6, respectively, when passed through the aperture 65 of the contact screen 21. The intensity distribution thus provided may be employed as intensity distributions on the photo-sensitive material set below the contact screen.

In this connection, let us consider the case where a hard photo-sensitive material 23 is exposed to the light whose illuminance distribution is as described above. In this case, the photo-sensitive material 23 will not be sensitive if the amount of exposure is smaller than the critical amount of exposure of the particular photosensitive material. If it is assumed that the optical intensity for the critical amount of exposure is represented by $P_O$ (on the vertical axis of the graphical representation in FIG. 6), then the parts of the photosensitive material 23 which are effectively exposed are defined by the areas A', B' and C' in FIG. 6, respectively, which are subjected to exposure with the optical intensity higher than the value $P_O$. As is apparent from the above description, the use of the contact screen makes it possible to provide the variation in intensity of the light passed through the liquid crystal panel as the variation in size of the dot formed on the photo-sensitive material. The variations in density of the image which is indicated on the liquid crystal panel by the light transmitted through it are converted into the variations in size of the dots. As a result, the image formed on the photo-sensitive material is rich in gradation.

The contact screen 21 is commercially available. In the case where the number of dots is about 500, the picture elements of the liquid crystal panel 19 can coincide with the apertures 65 of the contact screen 21 with high accuracy. In a commercially available contact screen, the pitch of the apparatus 65 is predetermined. Therfore, it is recommed that the pitch of the picture elements 61 of the liquid crystal panel 19 be determined according to the pitch of the apertures 65 of the commercially available contact screen. For instance, in a commercially available contact screen "DS Contact Screen GP1120L" (which represents the trade mark of a contact screen manufactured by Dai-Nippon Screen Co.), the pitch is 211.7 micrometers.

In the above-described embodiment, the contact screen 21 is provided on the side of the liquid crystal panel which is opposite to the other side where the point light souce is provided. However, the invention is not limited thereto ot thereby. For instance, the contact screen 21 may be provided on the other side of the liquid crystal panel 19, or disposed above or below the liquid crystal panel 19.

DOT-MATRIX PICTURE FORMING METHOD OF THE INVENTION

Figure 7:
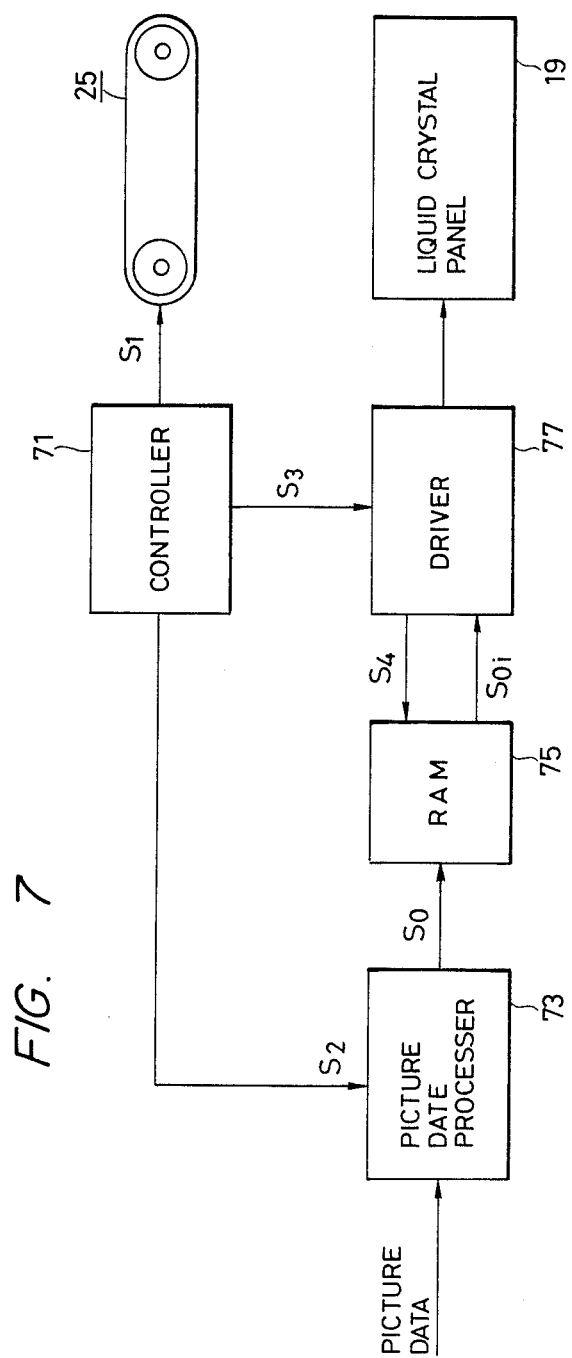
FIG. 7 is a block diagram of a circuit for controlling the apparatus shown in FIG. 1.

FIG. 7 is a block diagram of a circuit for controlling the apparatus shown in FIG. 1. A dot-matrix picture forming method of the invention will be described with reference to both of these figures.

In FIG. 7 there is shown a controller section 71. The photo-sensitive material 23 is moved by the conveying mechanism 25 according to an output signal $S_1$ of the control section 71 so that it is positioned below the contact screen 21. Thereafter, the photo-sensitive material 23 is brought into close contact with the contact screen 21. Conventional methods may be employed to move the photo-sensitive material and to bring it into close contact with the contact screen 21.

The photo-sensitive material 23 used in the method of the invention must be of hard type to form dots thereon. In other words, its gamma ($\gamma$) value should be one (1) or higher.

A picture data signal is applied to a picture data processing circuit 73 in response to an output signal $S_2$ of the control section 71. The picture data processing circuit 73 provides the picture densities of the picture elements 61 of the liquid crystal panel 19, to output picture density signals $S_O$. The picture density signals $S_O$ are stored in a RAM (random access memory) 75. A liquid crystal drive circuit 77 is a conventional one to drive the liquid crystal panel 19. The liquid crystal drive circuit 77 successively drives the large number of pixels of the liquid crystal panel 19 in response to output signals $S_3$ of the control section 71. That is, a multiplexing operation is used to drive, at any instant, only one of the pixels. In this operation, the liquid crystal drive circuit 77 applies a signal $S_4$ to the RAM 75 in synchronization with the signal $S_3$ to read a picture density signal $S_{Oi}$ for a given pixel from the RAM 75, and applies a voltage across the horizontal and vertical electrodes for that pixel according to the signal $S_4$, thereby to control with a multi-bit signal the quantity of light passing through the pixel.

Light from the point light souce 11 is applied to the liquid crystal panel 19 under the condition that the liquid crystal panel 19 has been driven as described above. The light passes through the pixels of the liquid crystal panel 19 with the intensity determined by the degree of opening of the pixels. The light reaches the apertures 65 (FIG. 6) of the contact screen 21. When the beams of light that have passed through the pixels pass through the apertures 65 of the contact screen 21, dofferemt Gaussian intensity distributions are provided according to the intensities which the light beams had before entering the apertures 6 (cf. FIG. 6). The light beams having the above-described intensity distribuitions are applied to the photo-sensitive material 23 in correspondence to the picture elements of the liquid crystal panel 19, and dots are formed at the parts of the photo-sensitive material 23 which are exposed to the quantity of light larger than the critical quantity of light of the photo-sensitive material 23. As a result, a picture is formed by the dots which are formed in correspondence to the pixels, and the gradations of the picture are provided by the dimensions of the dots which are determined according to the intensity of the light beams passed through the picture elements. Thus, a dot picture is formed on the photo-sensitive material by using the picture data.

After the picture formed on the liquid crystal panel 19 has been transferred onto the photo-sensitive materials 23 as described above, under the control of the control section, the contact screen 21 is removed from the photo-sensitive material 23, and the photo-sensitive material 23 is forwarded a distance equal to the length of the liquid crystal panel 19. On the other hand, picture data signals for the next picture are applied to the picture data processing circuit 71 in synchronization with the forwarding of the photo-sensitive material 23. The photo-sensitive material 23 thus forwarded is brought into close contact with the contact screen by the conveying mechanism 25, to form a dot picture in the same manner.

In the case where it is required to subject the photo-sensitive material 23 to developing in the ordinary manner, the conveying mechanism 25 may be so designed that the photo-sensitive material 23 is automatically conveyed to the developing unit.

In the above-described embodiment, a dot picture is obtained by forming single pictures on the photosensitive material through exposure which are defined by the length of the liquid crystal panel 19. However, if the contact screen is applied to a liquid crystal television set or the like similarly as in the abovedescribed embodiment, then the picture on the screen can be formed on th photo-sensitive material in one action.

Figure 8A:
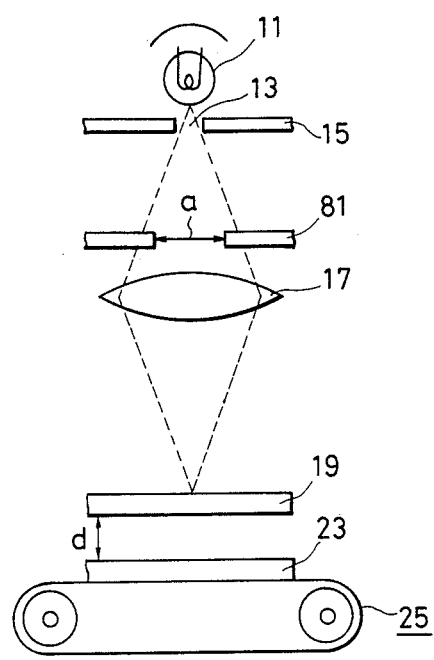
FIGS. 8A and 8B are diagrams of a second embodiment of the invention.
Figure 8B:
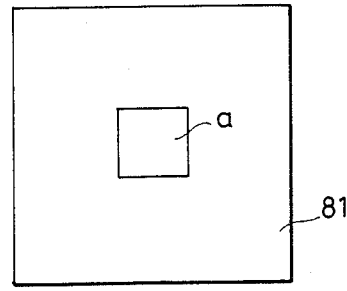

In FIGS. 8A and 8B are shown diagrams of a second embodiment of the invention. In the first embodiment, the contact screen is used to convert the output light of the point light source 11 into light which has the desired intensity distribution, as was described above. This is achieved by another method in the second embodiment.

That is, in the second embodiment, the contact screen of the first embodiment is not employed, and instead the liquid crystal panel 19 is separated by a distance d from the photo-sensitive material 23 so that the output light from the point light soource 11 that has passed through the liquid crystal panel 19 is converted into the light which has an intensity distribution. In the second embodiment, the lens 17 used to convert light rays from the point light source 11 into parallel light rays in the forst embodiment is replaced by a imageforming lens 17. An aperture plate 81 having an aperture a is disposed at the conjugate point between the lens 17 and the point light source 11. The aperture plate 81 determines the size of the image exposed on the photosensitive material 23. The intensity distribution can be formed more precisely by controlling the configuration of the aperture a.

THIRD EMBODIMENT OF THE INVENTION

Figure 9A:
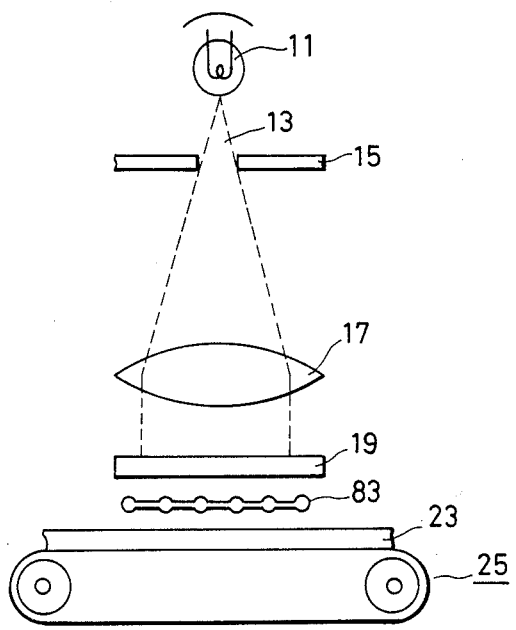
FIGS. 9A and 9B are diagrams of a third embodiment of the invention.
Figure 9B:
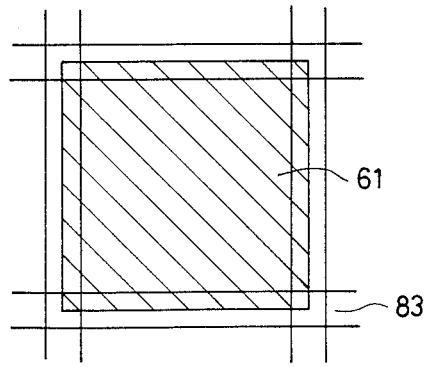

In FIGS. 9A and 9B are shown diagrams for a third embodiment of the invention. In teh third embodiment, a method different from those in the first and second embodiments is employed to convert the output light beam of the point light source into a light beam with an intensity distribution.

In the third embodiment, the contact screen 21 of the first embodiment is not employed, and instead a screen or net pattern 83 is disposed at a suitable distance from the liquid crystal panel 19, either above or below the liquid crystal panel 19, in such a manner that the net pattern 83 is coincident in pitch with the picture elements of the liquid crystal panel 19. FIG. 9B is a plan view showing the positional relationship between the picure element 61 (shaded with the oblique lines in the figure) and the net pattern 83.

As is apparent from the above description, in the dot-matrix picture forming method of the invention, the contact screen and other elements are used to convert the light beam applied to the photo-sensitive material from the light source into a light beam having an intensity distribution. A hard photo-sensitive material is used whose gamma ($\gamma$) value is more than one (1). Therefore, even if the parts of the conventional apparatus which are made up of the optical system and the laser scanner, which increase the manufacturing cost of the apparatus and are failure points, are replaced by the light gate which is relatively low in manufacturing cost and free from failure. However, similarly as in the conventional case, pictures can be formed on the photosensitive material by controlling the light valve with the electrical signals. As a result, editing and correction of the pictures thus formed can be performed.

An apparatus for practicing the dot-matrix picture forming method of the invention, namely, a dot picture forming apparatus can be manufactured at low cost and it has low maintenance cost.

What I claim is:

1. A method for forming a dot-matrix picture, comprising the steps of:
   applying light from a light source through an array of light gates to a photo-sensitive material;
   controlling an intensity of said light transmitted through each of said light gates according to picture data having a spatial distribution corresponding to a spatial distribution of said array of light gates, said transmitted intensity being controlled to provide at least two levels of non-zero light intensities;
   converting said transmitted light of controlled intensity to an exposed dot on said photo-sensitive material, the area of said exposed dot being related to the intensity of said transmitted light.

2. A method as recited in claim 1, wherein said array of light gates of said applying step corresponds to a liquid crystal array and said controlling step is conducted by applying electrical signals to said liquid crystal array according to said picture data.

3. A method as recited in claim 1, wherein said applying step applies a substantially uniform beam of light to a planar array of said light gates.

4. A method as recited in claim 1, wherein said applying step adjusts quantities of light passing through said light gates by controlling said light gates according to picture data, the light passing through each light gate being modulated to have an illuminance distribution before reaching said photo-sensitive material.

5. A method as recited in claim 1, further comprising the step of conveying said photosensitive material relative to said array of light gates.

6. A method for forming a dot-matrix picture, comprising the steps of:
   applying light from a light source through an array of light gates to a photo-sensitive material;
   controlling an intensity of said light transmitted through each of said light gates according to picture data having a spatial distribution corresponding to a spatial distribution of said array of light gates, said transmitted intensity being controlled to at least two levels of non-zero transmission; and
   converting said transmitted intensity to a beam of light the area of which is related to said transmitted intensity, by the use of a photosensitive material having a gamma ($\gamma$) value more than one (1).

7. A method as recited in claim 6, wherein said converting step comprises passing said transmitted light through a contact screen.

8. A method as recited in claim 7, further comprising the step of placing said contact screen adjacent said array of light gates.

9. A method as recited in claim 7, further comprising the step of placing said contact screen adjacent said photosensitive material.

10. A method as recited in claim 7, further comprising the step of placing said contact screen in close contact with said array of light gates and with said photosensitive material.

* * * * *